United States Patent [19]

Sano et al.

[11] Patent Number: 4,555,832
[45] Date of Patent: Dec. 3, 1985

[54] BUCKLE ASSEMBLY

[75] Inventors: Yasumasa Sano, Kanagawa; Tetsuya Ohwada, Chiba, both of Japan

[73] Assignees: NSK-Warner K.K.; Nippon Kinzoku Co., Ltd., both of Japan

[21] Appl. No.: 500,442

[22] Filed: Jun. 2, 1983

[30] Foreign Application Priority Data

Jun. 10, 1982 [JP] Japan .............................. 57-86347[U]

[51] Int. Cl.[4] ............................................... A44B 1/18
[52] U.S. Cl. .................................. 24/682; 24/265 R;
24/687; 24/703; 29/509; 29/515; 29/525;
403/274; 403/319; 403/341
[58] Field of Search .................. 24/128, 114.5, 163 R,
24/171, 194, 265 R, 265 A, 265 BC, 265 EC,
265 H, 265 CD, 265 EE, 573, 703, 633–650,
682–684, 687–689; 29/451, 509, 525, 526 R,
515; 280/801; 297/468, 483; 403/274, 284, 285,
315, 319, 360, 376, 341

[56] References Cited

U.S. PATENT DOCUMENTS

| | | | |
|---|---|---|---|
| 1,404,260 | 1/1922 | Arnold | 403/DIG. 7 |
| 2,339,354 | 1/1944 | Rubel et al. | 403/274 |
| 2,628,855 | 2/1953 | Cushman | 24/645 X |
| 2,715,169 | 8/1955 | High | 29/509 |
| 3,797,194 | 3/1974 | Ekstein | 29/509 X |
| 4,069,559 | 1/1978 | Weman | 24/650 |
| 4,071,929 | 2/1978 | Loomba | 24/687 |
| 4,096,606 | 6/1978 | Stephenson | 24/641 |
| 4,400,857 | 8/1983 | Morinaga | 24/633 |
| 4,402,114 | 9/1983 | Takagi | 24/265 R X |

FOREIGN PATENT DOCUMENTS

| | | | |
|---|---|---|---|
| 1067504 | 10/1959 | Fed. Rep. of Germany | 29/509 R |
| 308163 | 3/1929 | United Kingdom | 403/341 |
| 1408499 | 10/1975 | United Kingdom | . |
| 2039590 | 8/1980 | United Kingdom | 24/637 |

Primary Examiner—William E. Lyddane
Assistant Examiner—James R. Brittain
Attorney, Agent, or Firm—Cantor and Lessler

[57] ABSTRACT

Disclosed herein is a buckle assembly suitable for use in a vehicle seat belt. The buckle assembly includes a clinched anchor block fixed on a wire and having an interlocking portion projecting downwardly therefrom, a buckle base having a bottom wall defining a matching interlocking portion, which is in engagement with the interlocking portion of the anchor block, and a pair of side walls extending downwardly from the bottom wall. The anchor block is connected directly to both of the side walls of the buckle base. The interlocking portion of the anchor block is press-fit in the matching interlocking portion in the bottom wall of the buckle base. The clinch force of the anchor block against the wire is thus not reduced by the fixing work of the anchor block to the buckle base.

3 Claims, 9 Drawing Figures

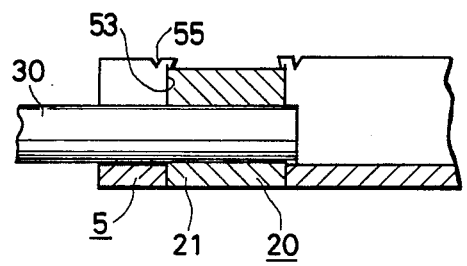
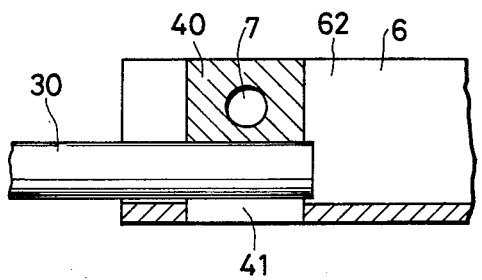
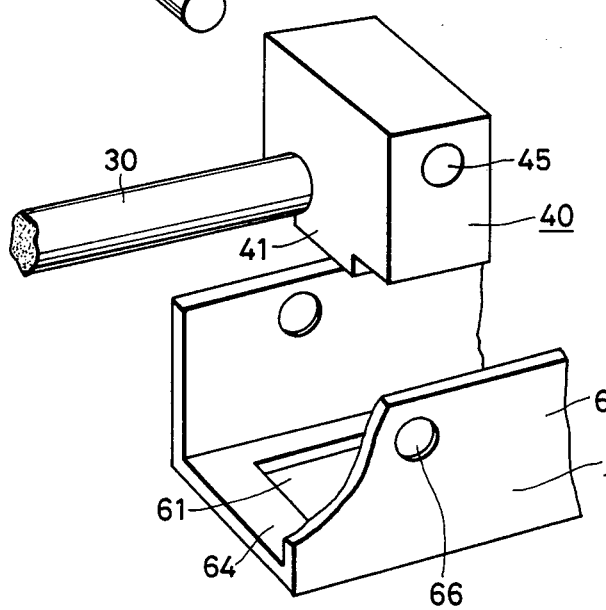
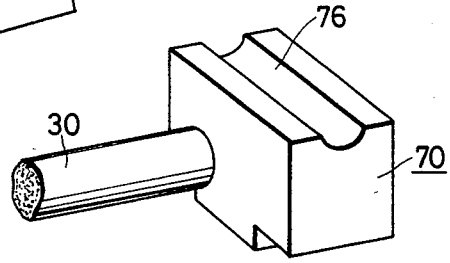

BUCKLE ASSEMBLY

BACKGROUND OF THE INVENTION (1) Field of the Invention:

This invention relates to a buckle assembly suitable for use in a vehicle seat belt, and more specifically to a buckle assembly in which the clinched anchor block or ferrule fixedly secured on a wire is press-fit to the buckle base.

(2) Description of the Prior Art:

As a method for securing a clinched anchor block on a buckle, it has been proposed to stamp the buckle base and then to clinch the anchor block together with the base vertically in both directions by means of a press or the like. This prior art method however includes a possible danger that the clinch force of the anchor block against the wire may be reduced where a channel-like buckle base is employed, since it is difficult to restrain the anchor block from expanding in the transverse directions, relative to the lengthwise direction of the buckle base, by dies due to narrow gaps between the side walls of the base and the anchor block and the anchor block may thus be allowed to expand in the transverse directions. The resulting prior art buckle assembly has a downward projection because the clinched anchor block is downwardly projected. Furthermore, it must also be necessary to pay attention to possible occurrence of cracks due to the stamping of the buckle base.

FIGS. 1 to 4 are schematic illustrations of such a conventional buckle assembly. FIG. 1 shows a buckle base 1 which has a central window 11 and a stamped portion 12. FIG. 2 is an end view in which the base is seen together with an anchor block clinched thereon from the wire side. The anchor block 2 is inserted in the window 11 of the base 1 and the wire 3 is seated in the stamped portion 12, followed by an application of pressures vertically in both directions as shown by arrows f so as to clinch the anchor block 2 on the base 1. In this prior art buckle assembly, the clinched anchor block 2 has a portion projecting downwardly from the base 1 and, as depicted in FIG. 3, the buckle 4 is protruded downwardly at a rear portion thereof. In addition, it is difficult to restrain the clinched anchor block from expanding in transverse directions by means of dies because only small gaps are left between the clinched anchor block and the side walls of the base. Accordingly, there is a danger that the clinch force of the anchor block against the wire may be reduced at portions, which are indicated by B in FIG. 4 since the anchor block may be allowed to expand in the transverse directions due to lack of any restraining forces in the directions indicated by A when the anchor block is clinched vertically in both directions as shown by f in the same drawing.

In order to avoid such a problem as mentioned above, it has also been contemplated to secure a clinched anchor block on a buckle base without clinching the former to the latter at all or excessively. Japanese Utility Model Laid-open No. 139421/1979 filed by the present assignee, NSK Warner K.K. and laid open to the public on Sept. 27, 1979 discloses connecting a clinched anchor block indirectly to the side walls of a base. Reference may also be made to U.K. Patent Specification No. 1,408,499 naming Frederick John Setters as a sole inventor and published on Oct. 1, 1975, in which two embodiments are described. According to the first embodiment shown in FIGS. 1 to 3 thereof, the bottom wall of a base is extended and bent upwardly. A window is also extended into the thus-extended portion of the bottom wall. Grooves are formed respectively in the side walls of an anchor block (i.e., ferrule). These grooves are fit over the side edges of the window to secure the anchor block on the buckle base. The other embodiment is illustrated in FIGS. 4 and 5 of the patent, in which keys or ribs are formed on the side walls of a buckle base and grooves formed in the side walls of an anchor block are fit over the keys or ribs. They are certainly free of the above-described problem, but they may not be physically strong enough as the anchor blocks are supported at rather limited points or lines.

SUMMARY OF THE INVENTION

An object of this invention is to solve the above-described problems of the prior art buckle assemblies.

It has been found that the above object may be attained by providing an interlocking portion at a lower portion of an anchor block and press-fitting the interlocking portion in a matching interlocking portion formed in the bottom wall of a buckle base and securing the anchor block to the side walls of the buckle base at a rather wide area instead of points or lines.

In a broad aspect of this invention, there is thus provided a buckle assembly including a clinched anchor block fixedly secured on a wire and having an interlocking portion projecting downwardly therefrom, a buckle base having a bottom wall defining a matching interlocking portion, which is in engagement with the interlocking portion of the anchor block, and a pair of side walls extending upwardly from the bottom wall, and means connecting the anchor block either directly or indirectly to both of the side walls of the buckle base, the improvement which comprises that the interlocking portion of the anchor block is press-fit in the matching interlocking portion in the bottom wall of the buckle base.

The clinch force of the anchor block against the wire is not reduced because the anchor block is not subjected to any clinching operation after its insertion into the buckle base. It is possible to attach the wire to the anchor block even after insertion of the anchor block into the buckle base, because the anchor block may be fixedly clinched on the wire without need for a great clinching force. Furthermore, the above buckle assembly according to this invention can bring about such additional effects that the anchor block is not caused to project out from the bottom wall of the base and the anchor block is supported at a rather wide area.

The above and other objects, features and advantages of the present invention will become apparent from the following description and the appended claims, taken in conjunction with the accompanying drawings.

BRIEF DESCRIPTION OF THE DRAWINGS

FIG. 6 is a cross-sectional view of the buckle assembly according to the first embodiment;

FIG. 7 is an exploded view of a buckle assembly according to the second embodiment of this invention;

FIG. 8 is a cross-sectional view of the buckle assembly according to the second embodiment; and FIG. 9 depicts a modified embodiment of the anchor block.

DESCRIPTION OF THE PREFERRED EMBODIMENTS

Figure 1:
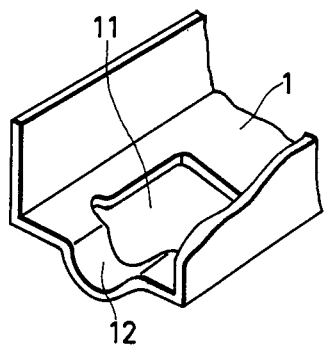
FIG. 1 is a fragmentary perspective view of a conventional buckle base.
Figure 2:
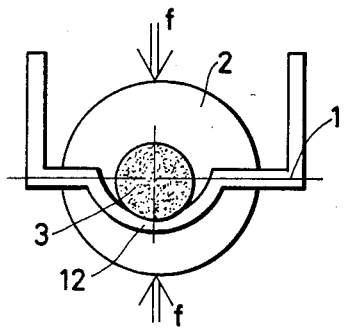
FIG. 2 is an end view of the buckle base carrying an anchor block clinched thereon, seen from the wire side.
Figure 3:
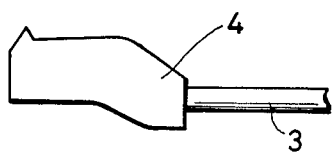
FIG. 3 illustrates the external profile of the buckle assembly.
Figure 4:
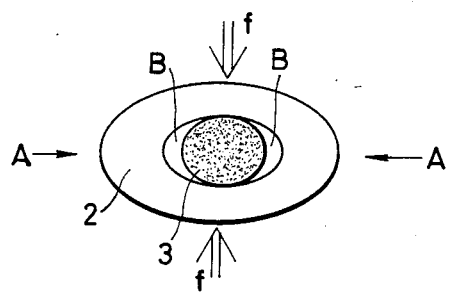
FIG. 4 is a schematic illustration showing a conventional way of clinching the anchor block against the wire.
Figure 5:
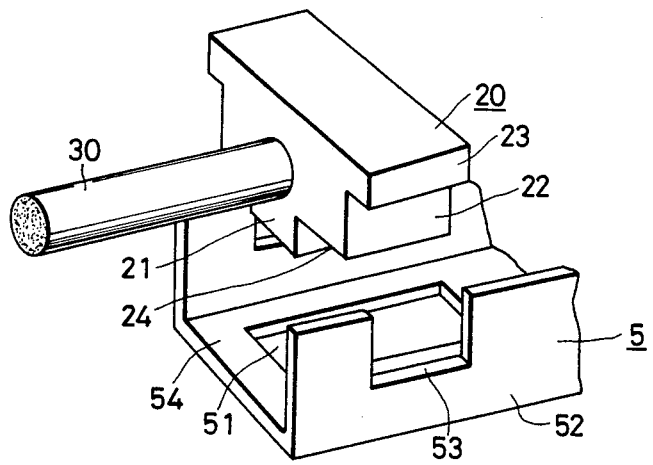
FIG. 5 is an exploded view of a buckle assembly according to the first embodiment of this invention.

FIG. 5 illustrates, in an exploded fashion, the buckle assembly according to the first embodiment of this invention. An anchor block 20 clinched on a wire 30 has an interlocking projection 21 and a pair of stepped portions 22 at lower parts thereof and forms a pair of side projections 23. A buckle base 5 is provided with a window 51 formed as a matching interlocking portion through a bottom wall 54, a pair of side walls 52 and a pair of indentations 53 formed respectively in the side walls 52 for engagement with the projections 23. The anchor block 20 is fixedly secured on the buckle base 5 by press-fitting the anchor block 20 in the buckle base 5, i.e., press-fitting the lower projection 21 in the window 51 of the buckle base 5 and causing the upper side projections 23 to engage with their corresponding indentations 53.

In FIG. 6, is illustrated the assembly of the clinched anchor block and buckle base in section. The lower projection 21 of the anchor block is press-fit in the window 51 formed through the bottom wall 54 of the base, while the upper projections 23 are press-fit in their corresponding indentations 53, preferably to such positions that the flat surface 24 is brought into contact with the bottom wall 54. If the fixing of the anchor block is insufficient by the press-fitting only, outer corner portions which are adjacent to the indentations 53 may be staked by means of V-notches 55 as shown in the drawing.

FIG. 7 shows the second embodiment of this invention, in which an anchor block 40 clinched on a wire 30 is provided with a lower projection 41 and a hole 45 adapted to permit a rod 7 to extend therethrough so as to connect the anchor block and buckle base together. The buckle base 6 is provided with side walls 62, bottom wall 64, a window 61 formed through the bottom wall, and openings 66 formed respectively through the side walls 62. For assembly, the projection 41 of the anchor block 40 is press-fit in the window 61 of the base and the hole 45 and openings 66 are brought into registration, followed by an insertion of the rod 7 through the hole and openings. The thus-obtained buckle assembly is illustrated in section in FIG. 8.

FIG. 9 depicts a modification of the second embodiment shown in FIG. 7. Instead of the hole 45 of the clinched anchor block 40, a semi-circular groove 76 is formed in the upper surface of an anchor block 70.

Having now fully described the invention, it will be apparent to one of ordinary skill in the art that many changes and modifications can be made thereto without departing from the spirit or scope of the invention as set forth herein.

What is claimed is:

1. A buckle assembly comprising a clinched anchor block fixedly secured on a wire and having a base portion, a stepped down interlocking portion projecting downwardly therefrom, and a pair of stepped up side projections; and a buckle base having a bottom wall with a window and a pair of upstanding side walls, each side wall having a notch in an upper portion thereof; the interlocking portion of the clinched anchor block being press-fitted in the window of the buckle base and the side projections being press-fitted in the notches, whereby the base portion of the anchor block rests on the bottom wall and the stepped ends of the base portion abut against the side walls.

2. The buckle assembly as claimed in claim 1, wherein V-notch staking is applied to each of the side walls of the buckle base at the outer corner portions adjacent to the notches.

3. The buckle assembly as claimed in claim 1, wherein the steps of said stepped-down interlocking portion extend in a direction perpendicular to the axis of the wire.

* * * * *